United States Patent [19]

Smith et al.

[11] 4,055,480
[45] Oct. 25, 1977

[54] MULTI-PHASE SEPARATION METHODS AND APPARATUS

[75] Inventors: Clay D. Smith; Douglas V. Keller, Jr., both of Lafayette, N.Y.

[73] Assignee: Standard Oil Company, Chicago, Ill.

[21] Appl. No.: 662,888

[22] Filed: Mar. 1, 1976

Related U.S. Application Data

[63] Continuation-in-part of Ser. No. 460,558, April 12, 1974, Pat. No. 3,941,679, and Ser. No. 561,168, March 24, 1975, which is a continuation-in-part of Ser. No. 423,577, Jan. 14, 1974, abandoned.

[51] Int. Cl.² .............................................. C10G 1/04
[52] U.S. Cl. ................................. 208/11 LE; 210/21; 210/73 W; 210/83
[58] Field of Search ................ 208/11 LE, 8; 210/21, 210/73, 83, 73 R, 73 W

[56] References Cited

U.S. PATENT DOCUMENTS

| 3,365,395 | 1/1968 | McDonald | 210/21 |
|---|---|---|---|
| 3,661,774 | 5/1972 | Masolocites | 210/83 |
| 3,695,354 | 10/1972 | Dilgren et al. | 208/11 LE |
| 3,752,758 | 8/1973 | Hindi et al. | 210/83 |
| 3,941,679 | 3/1976 | Smith et al. | 208/11 LE |

FOREIGN PATENT DOCUMENTS

| 891,472 | 1/1972 | Canada | 208/11 LE |

OTHER PUBLICATIONS

Hawley, G. G. ed., Condensed Chemical Dictionary, 8th ed., Van Nostrand Reinhold Co., N.Y., pp. 288, 887, 888.

Primary Examiner—Delbert E. Gantz
Assistant Examiner—James W. Hellwege
Attorney, Agent, or Firm—Strauch, Nolan, Neale, Nies & Kurz

[57] ABSTRACT

Multi-phase mixtures are resolved into separate phases by introducing the mixture into a body of liquid which contains a solvent for one of said phases and has a specific gravity intermediate two insoluble phases of the mixture. The latter accordingly migrate to different levels in the body of liquid and can be separately recovered therefrom. Solvent laden with the soluble phase is also separately removed from the body of liquid, and the solvent can then be stripped to isolate the soluble phase.

29 Claims, 4 Drawing Figures

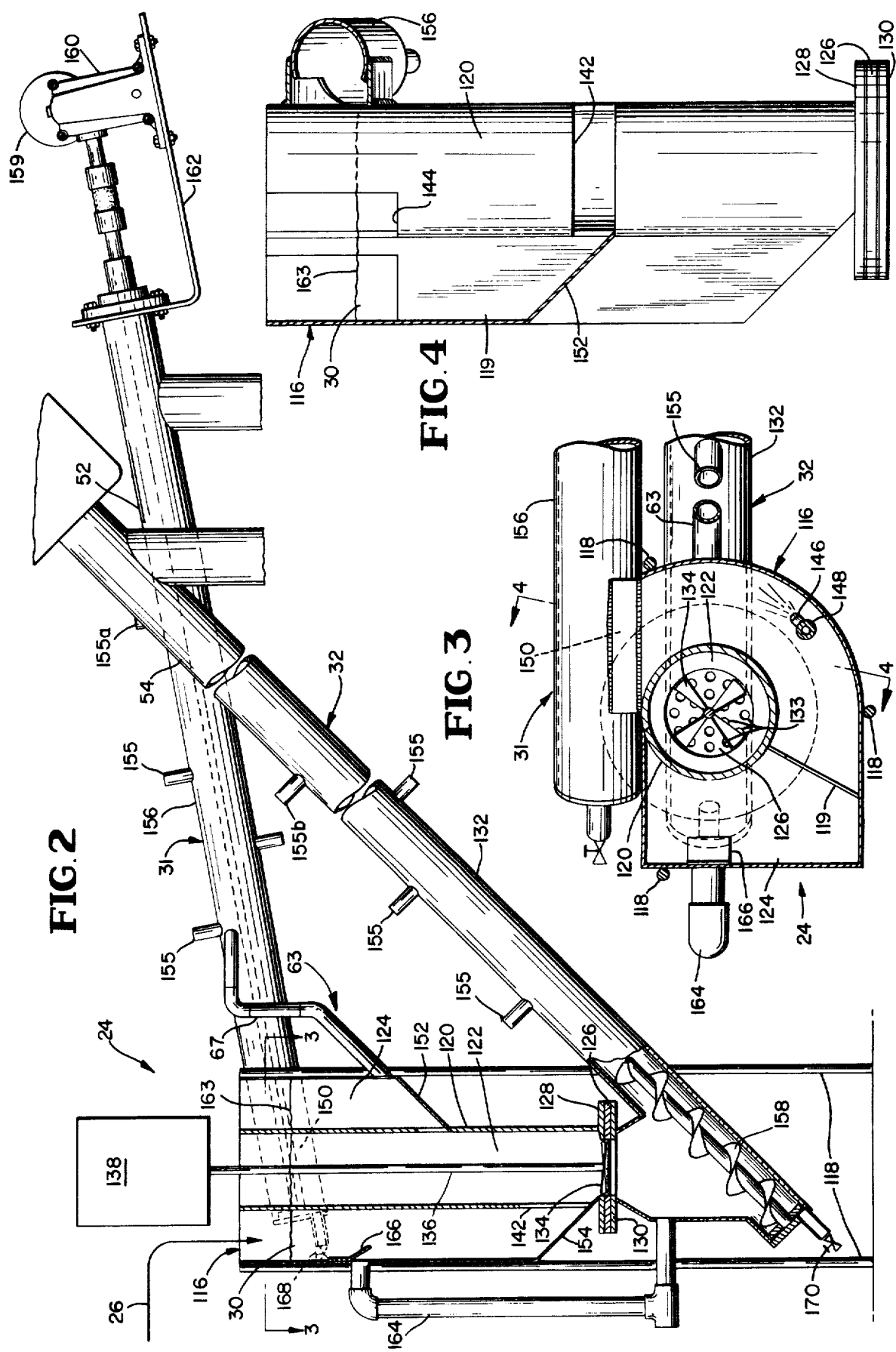

MULTI-PHASE SEPARATION METHODS AND APPARATUS

This application is a continuation-in-part of application Nos. 460,558 filed Apr. 12, 1974 (now U.S. Pat. No. 3,941,679), and 561,168 filed Mar. 24, 1975. Application No. 561,168 is a continuation-in-part of application no. 423,577 filed Jan. 14, 1974 (now abandoned).

This invention relates to methods of and apparatus for resolving multi-phase composites into the phases of which they are composed and, more particularly, to novel, improved methods of and apparatus for resolving such composites into a soluble phase and insoluble phases of different specific gravities.

One particularly useful application of the present invention is in the recovery of bitumen and solid carbonaceous products from tar sands; and its principles will accordingly be developed primarily by reference to this application. This is simply for the sake of convenience, however, and is not intended to limit the scope of protection we seek as there are other, also important applications of our invention. For example, other hydrocarbonaceous materials in the form of oils, resins, and asphaltenes are found in association with solid carbonaceous materials and mineral solids such as unconsolidated and consolidated rock formations and diatomaceous earth. The processes and apparatus disclosed herein can equally well be employed to effect a multi-phase resolution of such composites.

Furthermore, our invention is equally useful in the resolution of man made composites. As an example, the methods and apparatus described herein may equally well be employed to resolve the output from a coal reliquification process into fluid produts, unreacted coal, and ash.

In fact it is not even necessary that the insoluble phases be solids. Our invention can equally well be employed to resolve mixtures of soluble substances and liquids which are not soluble in the process liquid into their components. For example, the method and apparatus described herein can be employed to resolve a mixture of oil, coal, and water into these constituents.

Another important application of our process is the dewatering and deashing of the bitument froth produced in the water-surfactant processes, as typically practiced on Athabasca tar sands by Great Canadian Oil Sands. Conventionally bitumen produced by the hot water process is diluted with naphtha or other light hydrocarbons, and centrifuged with the object of reducing the bitumen's ash content. One important disadvantage of this technique is that a significant amount of the naphtha tends to be carried away on the inorganic reject from the process, and is also carried away as an emulsion in the significant amount of water that is in this system. Our process would eliminate the naphtha dilution step.

By using chemical or electrical emulsion breaking technology, followed by static or dynamic gravity techniques, three phase separation could be executed where the products would be bitumen, inorganic material, and water. The bitumen produced by this technique, because of its low ash and water content, could be upgraded without the inefficiencies of the presently required coking step. Avoiding this coking operation would reduce energy consumption, plant capital and operating costs, and would yield more syncrude per ton of ore mined. An additional benefit would be that presently incurred naphtha losses would be eliminated.

Turning then to the exemplary application of our invention first mentioned above, tar sands from the Athabasca formations typically include sand, clay, and from 5-21 percent by weight of a heavy, viscous bitumen which can be converted into many of the same products as conventional crudes. These sands also contain up to 5.5 percent by weight solid, nodular, carbonaceous substances and light carbonaceous material that appears to be carbonized plant material, which we collectively refer to as "coal". The physical characteristics, morphology, and proximate analyses of these two materials are very similar to coals found in seams with the possible exception that the ligher materials are perhaps more akin to charcoal.

This coal is present in amounts which make it a desirable product, and we have now discovered a way of economically and efficiently separating it from the bitumen and the other solids (ash, rejects, or tailings) with which it is associated in tar sands.

Specifically, we pointed out in parent application No. 460,558 that tar sand bitumen can be efficiently and economically recovered from the solids with which it is associated by using trichlorofluoromethane to solubilize the bitumen and form a fluid phase which can be separated from the solids. And, in parent application No. 561,168 we disclosed that the foregoing and related fluorochlorocarbons 1,2-difluoroethane are highly efficient parting liquids for separating ash from coal by gravity separation.

We have now discovered that, by combining the solvent extraction and gravity separation techniques disclosed in parent applications Nos. 460,558 now U.S. Pat. No. 3,941,679 and 561,168, tar sands can be resolved in a single step into bitumen, coal, and ash with sufficient economy and efficiency to make the recovery of coal independent of the other constituents of the tar sand worthwhile.

In our novel process for separating the constituents of tar sands into separate phases, the sand is introduced into a body of liquid containing 1,2-difluoroethane a fluorochlorocarbon solvent in which the bitumen dissolves. The coal typically has a specific gravity on the order of 1.30 and migrates toward the top of the body of liquid which is balanced as necessary to keep its specific gravity in the range of 1.40 to 1.50 in a typical operation. The unwanted solids, primarily sand and clay, have a higher specific gravity (ca. 2.4) and accordingly sink to the bottom of the body of liquid.

As a result, the solid phases become separated from each other and can be separately removed from the extractor, typically by inclined screw conveyors. The bitumen is separately recovered by drawing it off with the solvent carrier at an appropriate level.

One important feature of the novel separation process just described aside from its ability to effect a three-phase separation is that water present in the tar sand reports to the sinks with the sand, clay, and any other foreign material, making it unnecessary to later dewater the bitumen. This is important from the viewpoints of cost and process simplification (we have routinely encountered tar sand containing as high as 37 weight percent water) and quality of the bitumen product.

After the phases just discussed are removed from the extractor, the 1,2-difluoroethane or fluorochlorocarbon can be stripped from the solids and bitumen and recycled to complete the process.

In some applications, however, the 1,2-difluoroethane or fluorochlorocarbon will not be stripped from the bitumen at the separation site but will be recovered after the bitumen has been transferred to a subsequent operation or different location. This is because, as discussed in our copending application No. 493,475 filed July 31, 1974 (now abandoned), fluorochlorocarbons of the character we employ as extraction solvents and parting liquids are also excellent viscosity modifiers for promoting the flow of bitumens and similar material as is 1,2-difluoroethane. By not removing the carrier, therefore, the movement of the bitumen can be facilitated and the cost of moving it correspondingly reduced.

In preferred embodiments of the invention the solids are washed in countercurrent fashion with the 1,2-difluoroethane or fluorochlorocarbon solvent after they are recovered from the extractor to separate from the solids any bitumen still adhering to them. The wash liquid and bitumen is circulated to the extractor, resulting in an almost quantitative recovery of the bitumen from the tar sand.

Also, the relatively dilute liquid from the cleaning steps keeps the concentration of the bitumen in the extractor and therefore the viscosity of the parting liquid within intended levels. This is important because the speed at which the solids migrate toward the top and bottom of the body of liquid decreases as the concentration of the bitumen increases. Nevertheless, it is a unique and important feature of our novel process that separation velocities are not inhibited to a significant extent until bitumen concentrations of 50 weight percent or even somewhat higher are reached.

Preferably, the solids are drip dried before stripping the 1,2-difluoroethane or fluorochlorocarbon from them. By virtue of this step and the low boiling point and heat of vaporization of 1,2-difluoroethane or the fluorochlorocarbons we employ, the economics of recovering the solvent are very favorable.

Typically, reduction of the top size of the tar sand particles by comminution prior to extraction and, also, agitation in the extractor are utilized to facilitate the liberation of the bitumen from tar sand solids. In the latter case a novel baffle arrangement in the extractor vessel keeps the agitation from interfering with the migration of the solids through the body of liquid.

Another feature of our invention is circulation of the 1,2-difluoroethane or fluorochlorocarbon, bitumen liquor from the extractor to the comminutor. Because the liquor contains a large proportion of solvent, this promotes dissolution of the tar sand and considerably reduces the cost of carrying out the comminution step.

In general the ash content of the bitumen-laden liquor recovered from the extractor is very low (one-five weight percent). Because 1,2-difluoroethane and the fluorochlorocarbons we employ are uniquely effective in reducing the viscosity of the tar sand bitumens, the ash content can be even further reduced (to <0.1 percent) by a cyclone, centrifuge, or equivalent device, a low cost technique which is not available when more viscous substances are involved.

The term "fluorochlorocarbon" as used above and hereinafter is what we use to identify derivatives of methane and ethane which contain both chlorine and fluorine.

At least 24 derivatives fitting the foregoing description have been reported in the literature. Of these, sixteen are of no interest because their boiling points are too low or so high that the cost of recovering them from the tar sand constituents would be prohibitive.

The derivatives which we consider suitable because of their boiling points (ca. 40°–150° F) and other physical characteristics (low viscosity and surface tension and useful specific gravity), their chemical inertness toward the materials being processed, and their capacity for not leaving undesirable residues are:

1-Chloro-2,2,2-trifluroethane
1,1-Dichloro-2,2,2-trifluoroethane
Dichlorofluoromethane
1-Chloro-2-fluoroethane
1,1,2-Trichloro-1,2,2-trifluoroethane
1,1-Dichloro-1,2,2,2-tetrafluoroethane
Trichlorofluoromethane Of the listed compounds, all but the last three are at the present time too expensive to be practical from an economic viewpoint. And, of the latter, trichlorofluoromethane and 1,1,2-trichloro-1,2,2-trifluoroethane are preferred because of their optimum physical properties, chemical inactivity, and low cost.

Mixtures of two or more of the operable fluorochlorocarbons and of 1,2-difluoroethane plus one or more such fluorochlorocarbons may of course also be employed.

Trichlorofluoromethane is not flammable. It has low boiling and freezing points (ca. 75 and −168° F, respectively); a low heat of vaporization; and low viscosity and surface tension, all of which are desirable. The compound does not react with hydrocarbons; and it is non-toxic and non-corrosive, available in large quantities at reasonable cost, and almost completely recoverable in the course of the process. These are all important factors from the economic and safety viewpoints.

Trichlorotrifluoroethane has the same kinds of desirable properties as trichlorofluoromethane including chemical inertness, non-flammability, low freezing and boiling points, a useful specific gravity (1.65), low heat of vaporization, and low viscosity and surface tension. Like trichlorofluoromethane it is nontoxic and non-corrosive, recoverable with modest expenditures of energy, and available in quantity at a price which makes its use for our purposes economically feasible.

As will be apparent from the foregoing our novel multiphase separation processes and apparatus have a number of advantages, some of which are common to all applications of our invention and others of which are peculiar to the extraction of bitumen and solid carbonaceous products from tar sands and similar applications.

Among these advantages are that our invention not only for the first time makes it possible to recover valuable solid products from tar sands and similar composites but makes it possible to do this efficiently and economically.

It is of course another advantage of our invention that water is separated from the bitumen along with the other rejects in tar sand processing and from the soluble material in other applications of the invention.

Still another important advantage is that resolution of a composite into three separate phases is accomplished in a single, simple step which may be carried out on a continuous as well as batch basis.

Another important advantage is that the apparatus we employ is a closed system. This minimizes the loss of 1,2-difluoroethane or fluorochlorocarbons and also eliminates any ecological hazard they may eventually be proved to pose.

Our process is carried out at ambient temperatures and pressures and, in fact, remains efficient at both tropical and sub-zero Arctic temperatures. This is particularly advantageous in tar sand extraction and other applications where the separation process is carried out in the proximity of the geological formation in which the composite is found.

In addition, water requirements are minimal, another decided advantage.

Still other important advantages flow from the fact that we use only non-flammable, non-toxic, non-corrosive chemicals in our process. Personnel safety is assured, and corrosion damage to process equipment is essentially non-existent.

Yet another important advantage of our invention results from the nearly quantitative (98 plus weight percent) separation of the bitumen from the tailings in tar sand extraction and similar applications. This not only maximizes the utilization of a valuable natural resource but virtually eliminates the formidable problem of disposing of bitumen contaminated tailings encountered in other tar sand extraction processes.

Furthermore, it will be appreciated that the concentration of the bitumen in the extractor can be adjusted simply by varying the ratio between the inflow of at least relatively bitumenfree fluorochlorocarbon or 1,2-difluoroethane and the in flow of raw tar sand. This provides a simple and inexpensive way of maintaining the specific gravity of the parting liquid at a level which will result in the most efficient separation of coal and tailings because, as its bitumen content increases, the specific gravity of the parting liquid decreases.

As far as the prior art is concerned, a number of processes for recovering bitumen from tar sands have heretofore been proposed. Those of which we are aware are described on pages 3-5 of parent application No. 460,558. None of these suggest or would otherwise lead one to believe that the patented processes could be used to separate tar sands into bitumen, solid carbonaceous materials, and mineral solids or ash; and we believe it clear that they could not.

Similarly, a number of patents dealing with gravity separation processes for resolving composites such as coal into product coal and ash are described in parent application No. 561,168 (see pages 3-14). In this case, however, there is no indication in any of the patents in question that the parting liquid could be employed to dissolve and thereby separate yet a third phase from a composite such as a tar sand.

A three-phase separation process is described in U.S. Pat. No. 2,496,703 issued Feb. 7, 1950, to Ekbom. However, the patented process does not bear any significant relation to ours.

Ekbom discloses a gravity separator for coal in which middlings are recovered from the parting liquid independently of the floats (product coal) and sinks (ash or foreign matter). Middlings are solid particles which contain both coal and gangue and therefore report to neither the sinks nor floats but take up intermediate positions in the parting liquid and can be separated by withdrawing solids from the gravity separtion (or sink-float) bath at a level intermediate the sinks and floats.

This is not in any way akin to our novel process as described above because there is no formation or recovery of a soluble phase from the composite being processed.

From the foregoing it will be apparent to the reader that one primary object of the invention resides in processes and apparatus for resolving composites into multiple phases of different characteristics.

A related, primary object of the invention resides in the provision of such methods and apparatus in which gravity separation is employed to separate insoluble, immiscible constituents of the composite into two phases and in which the parting liquid is utilized to dissolve one or more soluble constituents of the composite and thereby form a third phase which can be separately recovered.

Another related and also primary object of the invention is the provision of separation methods and apparatus as aforesaid of widespread application.

Still another primary object of the invention resides in the provision of methods of and apparatus for processing tar sands and the like which are unique in that, in addition to the bitumen or other soluble, hydrocarbonaceous substances, solid, insoluble, carbonaceous materials are recovered as a separate phase.

Yet another primary object of our invention resides in the provision of methods and apparatus in accord with the preceding objects in which the multi-phase separation is accomplished in a single, simple step.

Other important but more specific objects of the invention reside in the provision of methods and apparatus as aforesaid:

1. which are efficient and economical and remain so over a wide range of operating temperatures;
2. which result in minimal ecological damage;
3. which present little, if any, hazard to operating personnel;
4. which permit the desired separation to be carried out at ambient temperatures and pressures;
5. which permit the desired separation to be carried out on a continuous as well as a batch basis;
6. which employ only non-flammable, non-corrosive, non-toxic chemicals that are easily recovered at modest cost and are chemically inert in the circumstances in which we employ them;
7. which require only minimum amounts of water and are therefore particularly useful in circumstances where this commodity is scarce;
8. which minimize the problems encountered in disposing of wastes generated in the process;
9. which have modest energy requirements;
10. in which the required separation is carried out in what is essentially a closed system;
11. which have desirably short process times;
12. which optimize the recovery of the valuable constituents of the composite being processed;
13. which utilize a minimum of manpower and materials;
14. which have all or various desirable combinations of the foregoing attributes.

Other important objects and features and additional advantages of the present invention will become apparent from the appended claims and as the ensuing detailed description and discussion proceeds in conjunction with the accompanying drawing, in which:

FIG. 2 is a vertical section through an extractor incorporated in the system of FIG. 1;

FIG. 3 is a horizontal section through the extractor taken substantially along line 3—3 of FIG. 2; and FIG. 4 is a section through the extractor taken substantially along line 4—4 of FIG. 3.

Figure 1:
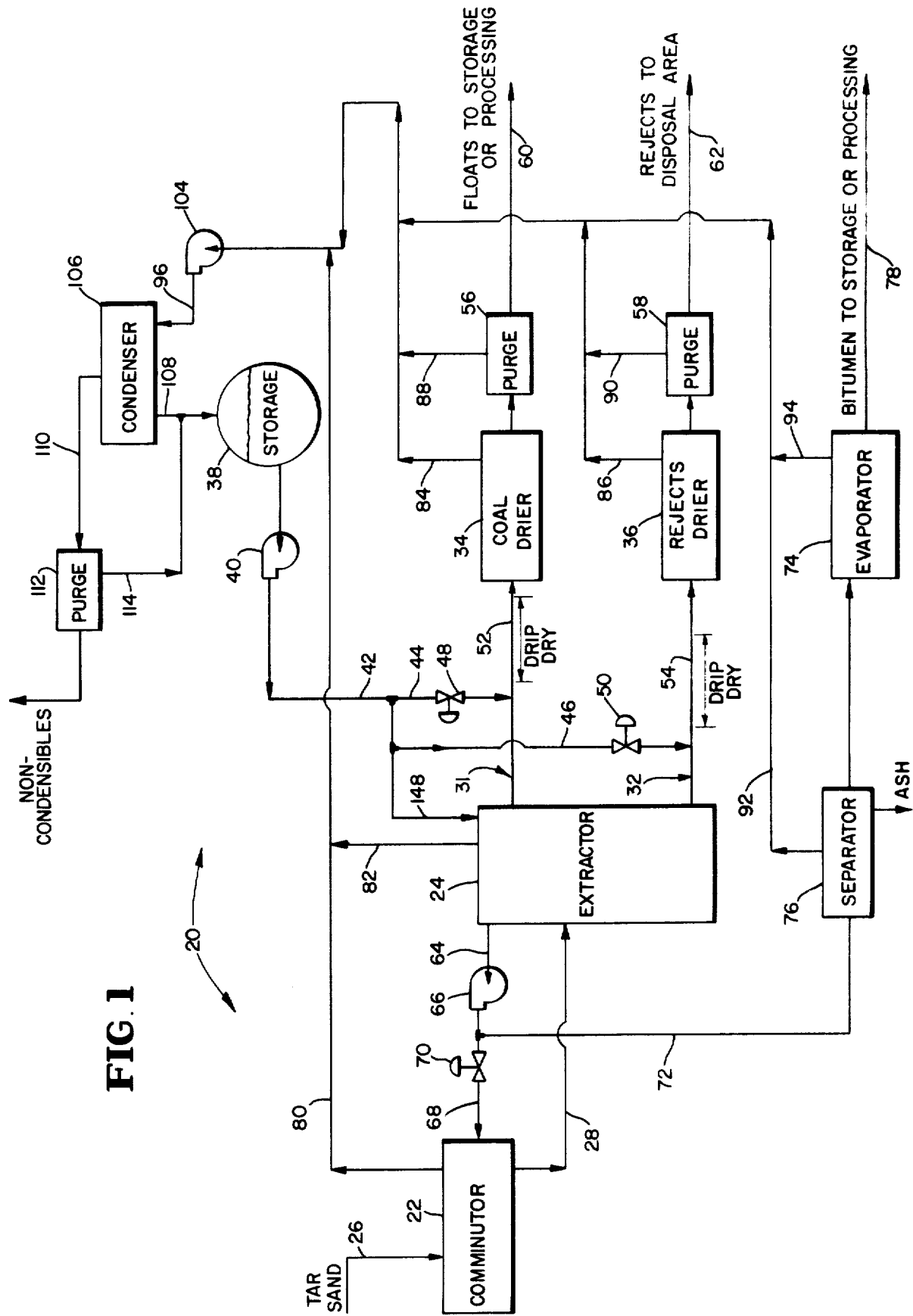
FIG. 1 is a schematic illustration of an extraction system in accord with the principles of the present invention.

Referring now to the drawing, FIG. 1 shows diagrammatically the apparatus 20 employed and the steps involved in effecting a three-phase separation in accord with the principles of the present invention.

The system 20 illustrated in FIG. 1 is particularly designed for the recovery of coal and bitumen from tar sands.

In large part, the components of this system are of the same character as their counterparts in the hydrocarbon recovery system disclosed in parent application No. 460,558 and in the gravity separation system described in parent application no. 561,168. To the extent that they are, therefore, such components will be described below only to the extent necessary for an understanding of the present invention.

Referring again to FIG. 1, then, the major components of system 20 include a comminutor 22 and an extractor 24. In the first of these components the tar sand introduced at 26 is wet ground to reduce its top size and thereby facilitate its further processing in extractor 24. We preferably employ a comminutor similar to the pulpers used in paper mills because of their ability to continuously reject rocks and other hard objects. Such devices are available from Black and Clawson Company.

The comminuted material is transferred through conduit 28 to extractor 24 and introduced into a body of liquid 30 (see FIG. 2). This liquid has the characteristics discussed above. That is, it has a specific gravity typically in the range of 1.40–1.50 and is composed in part of 1,2-difluoroethane and/or one or more fluorochlorocarbon bitumen solvents.

In extractor 24 the bitumen dissolves in the solvent, forming a fluid, bitumen-laden phase. Solid carbonaceous substances migrate to the top of the liquid body 30, forming one solid phase (floats). The mineral solids (primarily sand and silt) sink to the bottom of the liquid, forming a second solid phase (sinks, rejects, ash or tailings).

The two solid phases are removed from extractor 24 by upwardly inclined, screw conveyors 31 and 32 (see also FIG. 2) and transferred to dryers 34 and 36. As they move through the conveyors, the solids are washed with countercurrent flows of solvent pumped from storage tank 38 by pump 40 through conduits 42, 44, and 46 and sprayed onto the solids in conveyors 31 and 32, respectively. The rate at which the solvent is supplied to the conveyors can be regulated by valves 48 and 50 in conduits 44 and 46, respectively.

In the upper sections of conveyors 31 and 32 (identified by reference characters 52 and 54 in FIG. 1) the solvent, together with any bitumen dissolved in it, drains from the coal and the rejects. This drip drying substantially reduces the load on dryers 34 and 36.

The dryers may be of the character described in parent application No. 561,168. From them the dry coal and tailings are transferred to purge units 56 and 58 where they are swept with a gas (typically air) to strip away any remaining solvent, again as described in parent application No. 561,168. From the purge units, the dried coal is transferred to storage or a further processing operation as indicated by arrow 60; an the rejects, typically, are transferred to a disposal area as indicated by arrow 62.

Alternatively, these solids can be treated as a product. For example, in some cases they constitute over 98 percent pure silica sand and are therefore a valuable raw material for making glass.

The bitumen and carrier liquid is pumped from extractor 24 through offtake 63 and line 64 by pump 66.

As shown in FIG. 2, offtake 63 has a vertical standpipe section 67 which extends above the level of the liquid 30 in extractor 24. This arrangement keeps liquid from draining out of the extractor by gravity. Also, the standpipe section provides a quiescent zone, allowing solids in the effluent to sift back into the extractor. This additional removal of ash minimizes the need for and cost of subsequent ash removal and may even make a further ash separation step unnecessary.

A part of the bitumen-laden effluent from extractor 24 is circulated to comminutor 22 through conduit 68 at a rate determined by valve 70 to promote the comminution of the tar sand by dissolving the bitumen which binds the solid particles together. The remainder of the fluid phase flows through conduit 72 to evaporator 74 where the solvent is stripped from the bitumen, again as described in parent application No. 460,558.

Also, as shown in FIG. 1 and suggested above, the fluid phase may first be routed through a separator 76, which may be a cyclone or centrifuge, to reduce the ash content of the phase.

Because of the unique properties of 1,2-difluoroethane and the fluorochlorocarbons we employ, the viscosity of the effluent is extremely low. For example, the viscosity at 20° C of trichlorofluoromethane containing 15.3 percent Athabasca tar sand bitumen was found in one test to be only 1.5 centipoises. Consequently, the ash content can easily be reduced to <0.1 percent by centrifugal force.

The result is a high quality product which can be directly refined by conventional techniques.

In contrast the ash content of the bitumen produced by the commercially used hot water process is in the 5-6 weight percent range. This product can not be directly refined.

Furthermore, at present, there is no way of removing the ash from the bitumen product of the commercial process because of its high viscosity. Accordingly, the bitumen must first be coked and then refined by the Syncrude or a comparable process. Costs are accordingly high and yields low.

All of the solvent need not be removed from the bitumen in the stripper 74 to which the liquid phase is transferred from extractor 24 or ash separator 76. In fact the stripping step may be eliminated altogether. One of these options can be employed to keep the viscosity of the bitumen low and thereby facilitate its transfer through conduit 78 to a refining or subsequent operation.

Solvent vapors from comminutor 22, extractor 24, dryers 34 and 36, purge units 56 and 58, separator 76, and evaporator 74 are pumped through lines 80 . . . 96 by compressor 104 to condensor 106. Here the solvent is condensed and the liquid returned to storage tank 38 through line 108. Remaining vapors flow through conduit 110 to purge unit 112 where noncondensibles are stripped and rejected and the remaining solvent recovered by sorption and refrigeration as described in parent application no. 561,168. This condensate flows to return line 108 through conduit 114.

Referring now to FIGS. 2–4, one of the most important features of the novel system just described is the extractor 24 in which the tar sand is resolved.

Extractor 24 includes a vertically oriented, vessel or tank 116 supported from framework 118.

Supported concentrically in tank 116 by a notched bracket 119 is a cylindrical baffle 120 which divides the interior of the tank into an inner chamber 122 and an outer chamber 124. At the bottom of baffle 120 and tank 116 is an apertured disc 126 supported between flanges 128 and 130. The latter are attached, respectively, to the bottom end of tank 116 and to the inlet end of rejects conveyor housing 132. In a typical extractor as shown in FIG. 2, the apertures 133 through disc 126 will be on the order of 0.25 inch in diameter.

An agitator 134 is supported in tank 116 immediately above apertured disc 126 and rotated by a shaft 136 driven by a motor 138 supported in any convenient fashion above the tank.

Comminuted or as mined uncomminuted tar sand is fed into outer chamber 124 of the extractor at the location indicated by arrow 26 in FIG. 2. The tar sand falls through the body of liquid 30 in the extractor and through an opening 142 in baffle 120 (see also FIG. 4) into the zone adjacent agitator 134, which agitates the composite, thereby promoting its dissolution.

The bitumen constituents in the composite go into solution in the liquid and are removed with the carrier through offtake 63 as described above. The solid, carbonaceous substances or coal float upwardly through inner chamber 122 to the top of the body of liquid and pass over a weir 144 in baffle 120 (see FIG. 4) into outer chamber 124.

A spray nozzle 146 (see FIG. 3) is mounted in outer chamber 124 immediately above the surface of liquid body 30. Solvent supplied to nozzle 146 through branch conduit 148 (see FIG. 1) is discharged into chamber 124 tangentially to baffle 120. This spray displaces the coal or floats around chamber 124 to the inlet 150 of floats conveyor 31.

The higher specific gravity, mineral solids migrate downwardly into the inlet end of rejects conveyor 32. The apertured disc 126 described above slows this movement of the solids, increasing the contact time between the solids and the solvent in the extractor, thereby promoting the stripping of the bitumen from the solids.

Concentric baffle 120 keeps the turbulence generated by agitator 134 from disrupting the downward migration of the solids which begin to separate from the composite in outer chamber 124 at a level only somewhat below the surface of liquid body 30. This is important because the solids may be only 60m × 0 in a tar sand extraction process. The baffle therefore keeps the finer particles from being displaced upwardly in the liquid and carried out of the extractor with the bitumen and its carrier through offtake 63, contributing to a minimization of ash in the bitumen. As discussed above, the minimization of mineral solids (or ash) in the bitumen is important in its subsequent processing.

Settling of the mineral solids is also promoted by the necked down configuration of extractor vessel 116 shown in FIGS. 2 and 4. This configuration is obtained by inclining the walls of the extractor vessel inwardly at the locations identified by reference characters 152 and 154.

Referring now specifically to FIG. 2, it was pointed out above that the coal and mineral solids moving through conveyors 31 and 32 are preferably sprayed with fluorochlorocarbon or 1,2-difluoroethane to strip any remaining bitumen therefrom. The liquid can be sprayed into the conveyors through any of the inlets 155 spaced along their casings 156 and 132. It is preferred, however, that the liquid be introduced through the inlets identified as 155-a and 155-b as this provides the longest contact time between the counterflowing solvent and solids and thereby maximizes the stripping away of the bitumen.

As shown in FIG. 2, conveyors of the screw or auger type are preferred. The agitation of the solids provided by the augers insures intimate contact between the solvent and the solids, maximizing the removal of soluble materials. The agitation also promotes the subsequent draining of solvent and any bitumen dissolved in it from the solids.

The auger or screw (not shown) of conveyor 3 is rotated by a motor 159 through a reduction drive 160. The motor and reduction drive are supported from the upper end of conveyor housing or casing 152 by a bracket 162.

The auger or screw 158 of conveyor 32 is driven in a manner just described for conveyor 31. The drive for conveyor 32 is not illustrated.

As shown in FIG. 2, the upper ends of conveyors 31 and 32 extend above the surface level 163 of the liquid in extractor 24. Accordingly, liquid associated with the solids in the upper sections or zones 52 and 54 of the two conveyors drain from the solids through the conveyor casings back into the extractor. As a result, the coal and mineral solids reach dryers 31 and 32 in a "drip dried" state. As discussed above, this minimizes the load on the dryers and, therefore, the capacity they must have and the cost of constructing and operating them.

Liquid flowing back to the extractor through rejects conveyor 32 is recirculated to the interior of tank 116 through a bypass conduit 164 which communicates with the interior of the tank is approximately the level of offtake 63 at its upper, outlet end. This keeps the liquid flowing into the tank from interferring with the settling of the rejects and also concentrates the fluorochlorocarbon at the level where the highest proportion of bitumen remains to be dissolved. The liquid is pumped through the conduit by the hydraulic heads of the liquid in conveyor 32 and in tank 116 augmented by a pumping action produced by agitator 134.

A baffle 166 is mounted adjacent the outlet of the bypass conduit. It keeps the liquid discharged from the latter from causing turbulence in the quiescent liquid in chamber 124, again minimizing disruption of the gravity separation process.

In the extractor shown in FIG. 2, valves 168 and 170 are provided at the lower, inlet ends of conveyors 31 and 32, respectively. These lay no part in the separation process described above and are provided simply to facilitate cleaning the conveyors.

In a typical operation of the extractor just described, approximately 90 percent of the solvent will be introduced through conduit 46 into rejects conveyor 32 to strip the bitumen from the solids therein. Approximately 8.5 percent will typically be employed to wash the solids in the floats conveyor 31, and the remaining 1.5 percent will be introduced directly into the extractor and discharged through nozzle 146 to displace the floats to the inlet of conveyor 31.

Throughput times are extremely rapid. Less than two minutes elapses from the time a unit volume of tar sand is introduced into the extractor until the drip dried rejects reach the discharge end of rejects conveyor 32.

Although discussed as used in recovering bitumen and solid, carbonaceous substances from tar sands, it will be obvious to those skilled in the relevant arts that the novel extractor just described will not necessarily be employed for this purpose. It will be obvious to such persons that it is, instead, of general applicability in the resolution of composites into a soluble phase and insoluble phases of different specific gravities.

Utility of our novel processes and apparatus has been confirmed in a number of tests on tar sands from the Athabasca deposits.

The extractor we employed was essentially as illustrated in FIGS. 2-4 and described above. The extractor had a 6-inch diameter tank and a 2-inch diameter inner baffle. The extractor was operated at throughput rates producing up to 1.0 pounds of rejects per minute for periods as long as 4.5 hours without malfuction or significant variations in performance.

In these tests, the "as received" composition of the samples is analyzed by mixing 100 grams of tar sand with 400-600 ml of trichlorofluoromethane in a beaker until dissolution is complete. Coal is skimmed from the top of the body of liquid, and the liquid portion of the remaining material is decanted.

The percentage of oil (bitumen) in the decanted liquor is ascertained by weighing the liquor; heating it to 80° F, which drives off the trichlorofluoromethane; and weighing the residue.

Ash content of the oil is ascertained by igniting the oil at 750° C in a muffle furnace and weighing the residue.

To ascertain the moisture and mineral solids contents of the tar sand, the residue remaining after the liquid has been decanted is dried at up to 80° F until it reaches a constant weight to free it of trichlorofluoromethane and then weighed. The residue is then vacuum dried at 100° C to a constant weight. The difference between the two weighings represents the amount of moisture present, and the proportion of mineral solids can be calculated from the final weighing.

The analyses of typical samples originating in different regions of the Athabasca tar sands are shown in Table 1 below. ;t,0210

In a typical group of tests, tar sand as characterized above was processed through the extractor at throughput rates of 0.25, 0.50, and 1.0 pounds per minute.

Trichlorofluoromethane was supplied to the rejects conveyor to strip the remaining bitumen from the mineral solids at a rate of 80 ml a minute at the two lower tar sand feed rates and at a rate of 100 ml for the one pound per minute feed rate. The bitumen-laden solution was removed from the extractor at the same rates.

The apparatus was allowed to reach equilibrium, and the test was then continued for four hours. Periodic sampling over the 4-hour period showed essentially no significant variations in any of the tests.

The properties of moist solids discharged from the rejects conveyor were essentially the same in all of the tests. These characteristics are tabulated in Table 2 below.

TABLE 2

| Component | Weight Percent |
|---|---|
| Sand | 80.35 |
| Bitumen | 0.15 ± 0.05 of dry sand |
| Water | 2.65 |
| Trichlorofluoromethane | 17.0 |

Sand, water, and solvent content were ascertained by drying and weighing as in the bench analyses described above. Bitumen content was ascertained by the same procedure as in the bench analyses as was the coal content. Essentially quantitative amounts of the latter were recovered in all runs.

The tabulated data show that our novel process and apparatus are capable of effecting a virtually quantitative separation of bitumen from the mineral solids with which it is associated in a tar sand.

It was also observed that the percentage of parting liquid in the rejects could be varied ± 3 percent by altering the amount of agitation imparted to the solids in the rejects conveyor.

The characteristics of the bitumen laden liquid recovered from the extractor in the tests conducted at the two layer throughput rates are shown in the following table:

TABLE 3

| Throughput Rate | Weight Percent of Bitumen | Weight Percent of Ash (based on bitumen) |
|---|---|---|
| 0.25 pound per minute | 15.3 | 1-2 |
| 0.50 pound per minute | 47 | 4-5 |

In the highest throughput rate test the bitumen concentration rose to 77 percent which proved to be too high for optimum operation of the particular apparatus being employed. Nevertheless, the solids retained the characteristics identified in Table 2 showing that an essentially quantitative separation of the bitumen from the mineral solids was still being achieved.

Among the tar sands we have processed in the manner just described was one mined some 18 years earlier. The bitumen was liberated from it as readily and as efficiently as from the other samples we have tested. The hot water process, in contrast, is incapable of separating bitumen from other than freshly mined tar sand because the process becomes ineffective once the bitumen is exposed to air and oxidizes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of resolving a mixture or composite containing both soluble and insoluble hydrocarbonaceous materials and insoluble mineral material into separate phases two of which respectively contain said insoluble hydrocarbonaceous material and said insoluble mineral material and the third of which contains said soluble hydrocarbonaceous material, said method comprising the steps of: introducing said mixture or composite into a body of a liquid which contains 1,2-difluoroethane or a fluorochlorocarbon solvent for said soluble hydrocarbonaceous material and which has a specific gravity intermediate the specific gravities of said insoluble materials and is not miscible therewith, whereby said soluble hydrocarbonaceous material will dissolve in said liquid to form said third phase, one of said insoluble material will migrate toward the top of the body of liquid to form one of said two other phases, and the other of said insoluble materials will migrate toward the bottom of said body of liquid to form the other of said two phases; separately removing the insoluble material phases and said third phase from said body of liquid; and stripping the solvent from said third phase to isolate said soluble hydrocarbonaceous material.

2. A method as defined in claim 1 in which at least one of the insoluble material containing phases is composed at least in part of one or more non-solids.

3. A method as defined in claim 1 in which the solvent comprises a fluorochloro derivative of methane or ethane.

4. A method as defined in claim 1 in which the fluorochlorocarbon solvent is selected from the group consisting of [1,2-difluoroethane,]1-chloro-2,2,2-trifluoroethane, 1,1-dichloro-2,2,2-trifluoroethane, dichlorofluoromethane, 1-chloro-2-fluoroethane,1,1,2-trichloro-1,2,2-trifluoroethane, 1,1-dichloro-1,2,2,2-tetrafluoroethane, trichlorofluoromethane, and mixtures of the foregoing.

5. A method as defined in claim 4 in which the fluorochlorocarbon solvent is or includes trichlorofluoromethane.

6. A method as defined in claim 4 in which the solvent is or includes 1,1,2-trichloro-1,2,2-trifluoroethane.

7. A method of resolving a composite containing both soluble and insoluble hydrocarbonaceous materials and insoluble mineral material into separate phases which respectively contain insoluble hydrocarbonaceous material, insoluble mineral material and soluble hydrocarbonaceous material, said method comprising the steps of: introducing said composite into an extractor containing a body of a liquid comprising 1,2-difluoroethane or a fluorochloro derivative of methane or ethane in which said soluble hydrocarbonaceous material is soluble, said liquid having a specific gravity intermediate the specific gravities of said insoluble materials and being immiscible with respect to said materials, whereby said soluble hydrocarbonaceous material will dissolve in said liquid to form one of said phases, one of said insoluble materials will migrate toward the top of the body of liquid, and the other insoluble material will migrate toward the bottom thereof; and separately removing the insoluble material containing phases and the soluble material containing phase thus formed from said body of liquid.

8. A method as defined in claim 7 together with the step of stripping from at least one of the insoluble material containing phases removed from said extractor a soluble constituent of the composite removed from said extractor therewith.

9. A method as defined in claim 8 wherein the soluble material is stripped from the insoluble material containing phase in which it is incorporated by contacting said phase in countercurrent fashion with 1,2-difluoroethane or a fluorochloro derivative of methane or ethane.

10. A method as defined in claim 7 together with the step of comminuting said composite prior to introducing the composite into the extractor to reduce the maximum size of the composite and thereby facilitate the subsequent separation of the composite into phases containing the materials of which it is composed, liquid from the extractor being circulated to and mixed with the material being comminuted to promote the dissolution of the composite.

11. A method as defined in claim 7 together with the step of replacing the liquid removed from said extractor with liquid which has a lower content of the soluble hydrocarbonaceous material to keep the concentration of soluble substances in said liquid from exceeding a selected level.

12. A method as defined in claim 7 together with the step of separating from the soluble material containing phase removed from the extractor solids mixed therewith.

13. A method as defined in claim 7 together with the step of agitating the composite in the extractor to facilitate the dissolution of said composite into its constituents.

14. A method as defined in claim 13 wherein a quiescent zone is provided in the body of liquid in the extractor to minimize the interference of agitation as aforesaid with the migration of solids toward the bottom of the body of liquid in the extractor.

15. A method as defined in claim 7 together with the step of replacing liquid withdrawn from the extractor as a constituent of the soluble material containing phase with liquid having a lower concentration of the soluble constituents of said composite to thereby keep the specific gravity of the liquid in the extractor at or near a selected level.

16. A method as defined in claim 15 together with the step of washing at least one of the insoluble material containing phases removed from the extractor with 1,2-difluoroethane or a fluorochloro derivative of methane or ethane to strip soluble material therefrom, the liquid withdrawn from the extractor being replaced with effluent from said washing step to regulate the specific gravity of the liquid in the extractor.

17. A method as defined in claim 1 in which the fluorochloro derivative is selected from the group consisting of trichlorofluoromethane, 1,1,2-trichloro-1,2,2-trifluoroethane, and mixtures of the foregoing.

18. A process as defined in claim 7 in which the resolution of the composite into separate phases is carried out at ambient temperature and pressure.

19. A process as defined in claim 7 in which the steps of resolving the composite into separate phases, removing said phases from the extractor, and recovering the 1,2-difluoroethane or fluorochloro derivative are carried out without introducing water into contact with the composite or its constituents.

20. A method of resolving a tar sand into bitumen, carbonaceous solids, and mineral solids, said method comprising the steps of: introducing the tar sand into an extractor containing a body of a liquid comprising a fluorochlorocarbon solvent selected from the group consisting of trichlorofluoromethane, 1,2,2-trichloro-1,2,2-trifluoroethane, and mixtures of the foregoing and into contact with the liquid whereby the bitumen will dissolve in the liquid and carbonaceous and mineral solids will respectively migrate to the top and bottom of the body of liquid; and separately removing the mineral and cabonaceous solids and bitumen-laden liquid from the body of reactor.

21. The method of claim 20 together with the step of subjecting the bitumen-laden material to centrifugal force to separate solids therefrom.

22. The method of claim 20 together with the step of wet grinding the tar sand in a fluorochlorocarbon as aforesaid prior to bringing it into contact with the body of liquid to thereby facilitate the resolution of the tar sand into bitumen and carbonaceous and mineral solids.

23. The method of claim 20 together with the step of stripping from the solids fluorochlorocarbon removed from the extractor therewith, said solids being drip dried before the fluorochlorocarbon is stripped therefrom to minimize the amount of fluorochlorocarbon associated with the solids and thereby the energy required to strip the fluorochlorocarbon therefrom.

24. The method of claim 23 wherein the fluorochlorocarbon is stripped by sweeping the solids with a noncondensible gas and wherein the fluorochlorocarbon is recovered by purging noncondensibles from and then condensing the fluorochlorocarbon.

25. The method of claim 20 wherein the carbonaceous and mineral solids removed from the body of liquid are contacted with a countercurrent flow of a fluorochlorocarbon as aforesaid to separate from said solids bitumen associated therewith.

26. The method of claim 25 wherein the fluorochlorocarbon with which the solids are contacted to separate bitumen therefrom is then added to the body of liquid to replace fluorochlorocarbon withdrawn from said body of liquid with the soluble constituents of the tar sand.

27. The method of claim 20 wherein the specific gravity of the body of liquid is kept between about 1.40 and 1.50 and the viscosity of said liquid is kept sufficiently low to permit rapid migration of the solids therein by limiting the concentration of the bitumen in said liquid to a maximum of about 50 percent by weight based on the total weight of the liquid.

28. The method of claim 20 together with the step of agitating the body of liquid and the tar sand therein to facilitate the resolution of the tar sand into solids and bitumen.

29. A method of resolving a mixture of composite containing hydrocarbonaceous and inorganic materials into separate phases which respectively contain undissolved hydrocarbonaceous material, inorganic material, and dissolved hydrocarbonaceous material said method comprising the steps of: introducing said mixture or composite into a body of a liquid which contains 1,2-difluoroethane or a fluorochlorocarbon solvent for soluble hydrocarbonaceous material in said mixture or composite and which has a specific gravity intermediate the specific gravities of said inorganic material and a part of sid hydrocarbonaceous material and is not miscible therewith, whereby soluble hydrocarbonaceous material will dissolve in said liquid to form one of said phases, undissolved hydrocarbonaceous material will migrate to one level in the body of liquid to form a second phase, and inorganic material will migrate to a different level in said body of liquid to form a third phase; separately removing the undissolved hydrocarbonaceous material containing phase, the inorganic material containing phase, and the dissolved hydrocarbonaceous material containing phases from said body of liquid; and stripping the solvent from the last-mentioned phase to isolate the dissolved hydrocarbonaceous material.

* * * * *